Patented Feb. 21, 1933

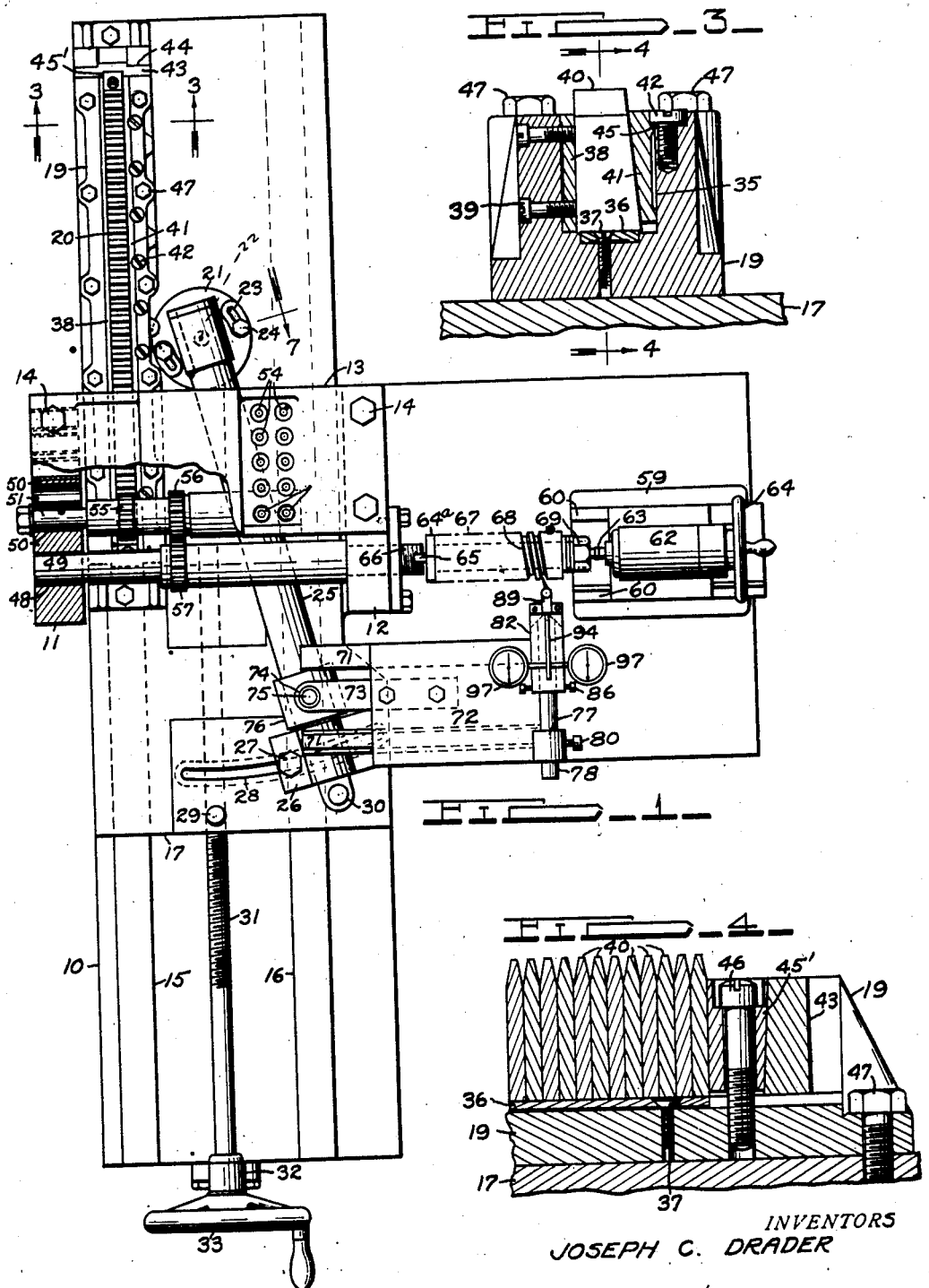

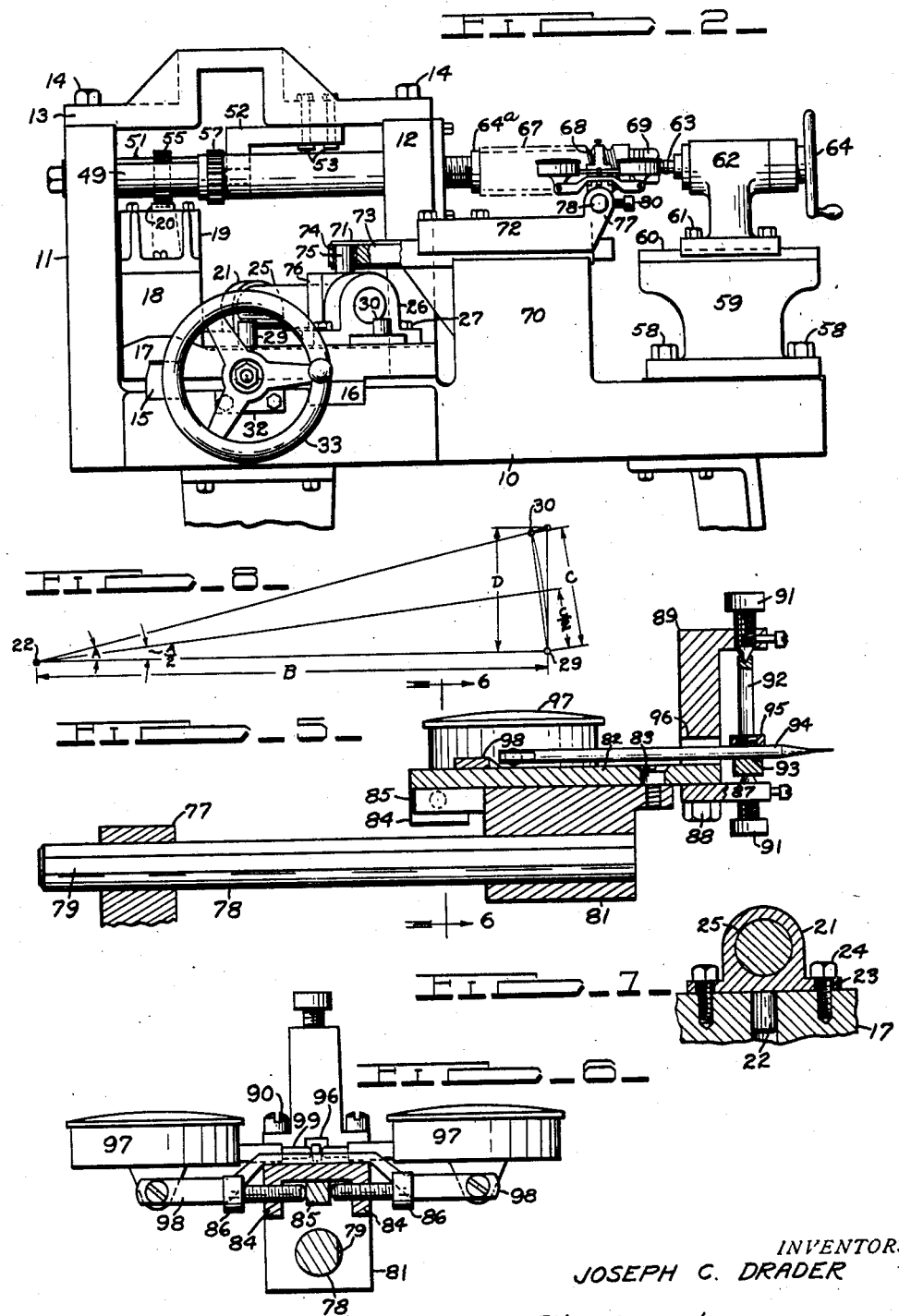

1,898,084

UNITED STATES PATENT OFFICE

JOSEPH C. DRADER, OF DETROIT, MICHIGAN, ASSIGNOR TO MICHIGAN TOOL COMPANY, A CORPORATION OF MICHIGAN

LEAD TESTING MACHINE

Application filed November 10, 1927. Serial No. 232,226.

This invention relates to a lead testing machine adapted to test the lead of hobs, taps, milling cutters, and similar devices.

Articles of this kind, particularly ground hobs used for cutting gears, must be extremely accurate, the tolerances usually being only a few ten thousandths of an inch. In fact, the real objective is to have the hobs absolutely accurate without any measurable variations. The hobs are first made and then hardened. The hardening distorts them somewhat and, to correct this distortion they are ground. In grinding the hobs it is necessary to measure them from time to time to test the accuracy of the grinding. Obviously the accuracy of the grinding is determined largely by the ability of the operator to determine whether the hob is accurate or not. Even though the grinding machine be quite accurate, the work is no better than the facilities for measuring the accuracy. The big difficulty with testing machines heretofore employed is that there are so many inaccuracies in them that they are useless for testing articles that must be made with a high degree of accuracy of ground hobs. The present invention is directed to the provision of an improved lead testing machine that will test hobs and the like within very close limits.

The object of the invention is, therefore, to provide an improved lead testing machine giving greater accuracy than heretofore has been obtainable.

A further object is to provide a machine of this character that will enable the lead of a hob or similar device to be quickly and easily, as well as accurately, tested.

The above being among the objects of the present invention the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views,—

Fig. 1 is a plan view of my machine.

Fig. 2 is an end view of my machine.

Fig. 3 is an enlarged sectional view of the rack taken on line 3—3 of Fig. 1.

Fig. 4 is a sectional view taken on line 4—4 of Fig. 3.

Fig. 5 is a vertical section taken longitudinally through the indicating instrument supporting mechanism.

Fig. 6 is a sectional view taken on line 6—6 of Fig. 5.

Fig. 7 is a vertical sectional view taken on line 7 of Fig. 1 illustrating the method of pivotally securing the sine bar to the table.

Fig. 8 is a diagrammatic sketch illustrating the method of computation employed in the use of the machine shown.

The machine illustrated has a T-shaped bed or base 10 (Fig. 2) provided with vertically extending bearing blocks 11 and 12. A head 13 is secured to the upper faces of the blocks 11 and 12 by bolts such as 14. The head of the T-shaped base is provided with longitudinally extending ways 15 and 16 (Fig. 2) on which is slidably mounted a table or carriage 17. The table 17 is provided along one side thereof with an upwardly extending rib 18 (Fig. 2) and supported on this rib, is a frame 19 of a rack which is designated generally in Figs. 1 and 2 as 20, the rack 20 extending in the direction of movement of the table 17. Also mounted on table 17 is a supporting member 21 having a stud 22 (Fig. 7) rotatably received in the table 17. The member 21 is provided with elongated slots 23 (Fig. 1) through which the screws 24 extend for securing the bracket 21 to the table 17 and for locking the same against rotation. Mounted in the support 21 is one end of a bar 25 which I prefer to call a "sine" bar because of the method employed for determining its angularly adjusted position. The sine bar 25 is positioned parallel with the surface of the table 17 and its opposite end is received in an adjustable support 26. Bolts 27 extend through the bracket 26 and into an arcuate slot 28 formed in the table 17, the center of the arc of the slot 28 being the axis of the pin 22 about which the bracket 21 rotates. The angular position of the sine bar 25 may be varied with respect to the path of movement of the table 17 by loosening the bolts 24 and 27 and swinging the support 26 along the slot 28 within the limits of the same, and thereafter re-tightening the bolts 24 and 27 to lock the bar 25 in adjusted position. A vertically extending pin 29 is secured in the table 17 at a predetermined distance from the pin 22. A similar pin 30 is secured to the bracket 26 at an equal distance from the pin 22. These pins are employed as measuring surfaces for accurately determining the angular position of the bar 25 with respect to the path of movement of the table 17 as will be described later.

The table 17 may be moved longitudinally on the slides 15 and 16 by means of a screw 31 held against axial movement with respect to the bed 10 by a conventional box 32, the screw 31 threadably engaging a suitable nut (not shown) secured to the table 17 in a conventional manner. A suitable hand wheel such as 33 is provided for manually rotating the screw 31.

The rack 20 is, because of the accuracy necessary in a device of this type, constructed in the following manner, as shown in Figs. 3 and 4. The rack frame 19 is provided with a central upwardly opening recess 35 (Fig. 3). The recess 35 is preferably provided with a bottom liner 36 secured in place by screws such as 37 and a side liner 38 secured in place by screws such as 39. Received within the recess 35 and in contact with the liners 36 and 38 are a plurality of separately formed rack teeth members 40 each of which represents a separate tooth of the rack. These members are formed separately because of the accuracy with which they may be formed as compared with integrally formed teeth. The members 40 are placed in contact with each other through substantially the entire length of the recess 35. It will be noted that the errors in the thickness of the members in assembling them in this manner are accumulative, but on the other hand, they may be so shifted with respect to each other that it is possible to absolutely eliminate such errors and by this method it is possible to obtain a substantially perfect rack. The members 40 on the edge opposite to that which contacts against the liner 38 are tapered outwardly toward their base, and a longitudinally extending wedge member 41 having a face complementary to the angular edge of the members 40 is secured between the angular edges of the members 40 and the adjacent wall of the recess 35, it being drawn tightly into place by means of the screws 42 which engage the shoulders 45 formed adjacent the upper edge of the member 41. The members 40 are forced into close relationship with each other in the length of the rack by means of the cross members 43 (Figs. 1 and 4) which are received in the cross slots 44 formed in the side walls of the rack frame 19 adjacent the ends thereof. Wedge members 45′ are forced down into position between the cross members 43 and the adjacent member 40 by means of screws 46 which extend through the same and threadably engage the frame 19. The rack frame itself is secured to the table 17 by the screws or bolts 47.

A rack made in this manner can be made much more accurate than a lead screw and by using a rack of this kind with a direct connection to the spindle that rotates the work a higher degree of accuracy can be obtained.

The bearing block 11 on the bed of the machine is provided with an opening 48 (Fig. 1) through the same above the rack 20 and transversely to the direction of movement of the table 17. A shaft 49 is rotatably received in the opening 48 and extends across the carriage or table 17 and through the block 12 in which it has suitable bearing. A plurality of similar openings 50 are also provided in the bearing block 11, said openings being spaced horizontally with relation to the opening 48. A shaft 51 is rotatably mounted in one of the openings 50 and extends toward the block 12 in parallel relationship with the shaft 49, the end adjacent the block 12 being rotatably supported in the downwardly extending leg of an L-shaped bracket 52 (Fig. 2) which is secured to the lower face of the head 13 by means of the screws or bolts 53. A plurality of openings 54 are provided in the head 13 (Fig. 1) for the reception of the bolts 53 in line with the various openings 50 so that the shaft 51 may be shifted into any one of the openings 50 and the bracket 52 may be equally shifted to accommodate the corresponding end of the shaft 51 as shifted. Secured to the shaft 51 in vertical alignment with the rack 20 is a gear 55 which meshes with the rack 20. A second gear 56 off-set from the gear 55 is secured on the shaft 51 for equal rotation with the gear 55, and a third gear 57 is secured to the shaft 49 in meshing relationship with the gear 56. Accordingly, longitudinal movement of the table 17 with a corresponding movement of the rack 20 causes a corresponding rotation of the gear 55. The gear 56 in rotating with the gear 55 causes a corresponding rotation of the gear 57 and shaft 49. The relative rate of rotation of the shaft 49 with respect to the gear 55 may be varied by shifting the shaft 51 to any one of the various openings 50 as previously described, and by replacing the gear 56 with a similar gear of sufficient proportions to mesh with the gear 57 when the shaft 51 has thus been shifted. As indicated in Fig. 2, the head 13 is formed to permit the use of a gear such as 56 of much larger diameter than that shown.

Secured to the bed 10 by the bolts 58 is a support 59 (Fig. 2) provided with slideways 60 on its upper surface extending in parallel relationship with respect to the axis of the shaft 49, and slidably supported on the slides 60 and locked thereto in adjusted slidable position by the bolts 61 is the tail stock 62 provided with a conventional center 63 controlled in its axial position by the hand wheel 64, the center 63 being in exact axial alignment with the axis of the shaft 49. A mandrel or arbor, such as 64a, is provided having tongues 65 received in the slots 66 in the end of the shaft 49, the mandrel being supported between the shaft 49 and the center 63. A suitable piece of work 67 having helical threads 68 or like formations to be tested may be supported on the mandrel 64 and secured thereto against rotation by the nut 69 or other suitable means.

The bed 10 is provided with an upwardly projecting portion 70 (Fig. 2) between the table 17 and tailstock 62, the upper surface of which is formed to provide a pair of slides 71 extending parallel to the shaft 49 and transversely to the path of movement of the table 17. Supported on the slides 71 is a carriage 72 which, in turn, supports a measuring mechanism that will later be described. The carriage 72 has an extension 73 which projects over the sine bar 25, the extension being provided with a vertical opening 74 in which is rotatably mounted a pin 75 on a collar 76 that encircles the sine bar 25 and is slidable thereon. It will be apparent that, because of this connection between the carriage 72 and sine bar 25, when the table 17 is moved forward and backward on the slides 15 and 16, carrying with it the sine bar 25, the collar 76, in sliding along the sine bar 25, will cause the carriage 72 to move transversely with respect to the table 17 on the slide 71 an amount varying with the angularity of the bar 25 in respect to the path of movement of the table 17. Thus, by varying the angularity of the sine bar 25, the rate of movement of the carriage 72 transversely with respect to the longitudinal movement of the table 17 may be varied, the angular position of the bar 25 being adjustable for any particular piece of work 67.

The sine bar 25 may be positioned with absolute accuracy and since there is no lost motion in the connection between it and the longitudinally movable table or carriage 72, the latter moves laterally without the errors usually encountered with lead screws and driving gears. Also, since the rack 20 can be made with extreme accuracy and since the connection between it and the spindle or shaft 49 is very direct, the chance for error in the relative movement of spindle and the longitudinally movable carriage or table 72 is kept at a minimum that is below prior practice.

The measuring mechanism (later described) is supported on the carriage 72 in the following manner. The carriage is provided with a bracket 77 which supports a horizontally positioned shaft 78. The shaft 78 is provided with a flat surface 79 (Fig. 6) with which the screw 80 (Fig. 2) contacts to lock the shaft 78 in a predetermined rotative position and in axially adjusted position. The end of the shaft 78 nearest the mandrel 64a has fixed thereto a supporting bracket 81 having a flat upper surface. A supporting plate or table 82 is movably mounted on the upper surface of the bracket 81 and is secured thereto for rotative movement only by a screw pin 83 which passes through the same adjacent the forward end of the bracket 81. The table 82 has formed thereon adjacent its rear end two downwardly extending side portions 84 which extend on either side of a rearwardly extending projection 85 of the bracket 81. Screws such as 86 extend through the side portions 84 and engage the sides of the projection 85 whereby the pivotal position of the table 82 with respect to the support 81 may be controlled. The table 82 is provided at its forward end with a lower bracket 87 secured thereto by a bolt 88 and an upper bracket 89 secured thereto by the screws 90. Pivotally supported between the center screws 91 carried by the brackets 87 and 89 is a shaft 92 which is provided with a diametric opening 93 in which is received a pointer bar or arm 94, the pointer bar being locked against movement in the opening 93 by means of a nut 95. The pointer bar 94 extends rearwardly through a relatively large opening 96 in the bracket 89 and terminates adjacent the rear end of the bracket 81. A pair of micrometer gauges 97 are supported from the table 82 by means of the strap 98 with their shafts 99 in contact with the rear end of the pointer bar 94.

In operation, after the sine bar 25 has been adjusted to correspond with the theoretical lead of a thread or helix to be tested, and the article having such thread or helix has been secured in place on the mandrel 64a, the screw 80 is loosened and the shaft 78 moved toward the mandrel 64 until the outer end of the pointer bar 94 is engageable with the thread 68, after which the screw 80 is tightened to hold the bar 78 against movement. The screws 86 are then adjusted to swing with the table 82 about the pin 83 until the outer end of the pointer bar 94 is in proper contact with the sides of the thread 68. The handle 33 is then turned, which causes longitudinal movement of the table 17 and consequent rotation of the mandrel 64a and movement of the carriage 72. Should the lead of the thread 68 be perfectly formed, the pointer 94 will remain stationary with respect to the table 82, but should any variation of the lead of the thread 68 occur, the end of the pointer bar 94 will move in accordance with such variation, and because of the relative difference in length of the pointer bar 94 on either side of the shaft 92 the rear end of the pointer bar 94 will be caused to move a correspondingly greater amount which will be indicated on the indicating dials 97, thus disclosing to the operator of the machine such inaccuracies. It will be apparent, of course, that by properly proportioning the distance between the end of the bar 94 which contacts with the thread 68 with respect to the axis of the shaft 92 and the distance between the axis of the shaft 92 and the point of contact of the bar 94 with the shafts 99 of the indicating instruments 97, it will be possible to measure the amount which the thread 68 is out of its true path in decimal parts of an inch.

The method employed in determining the distance between the pins 29 and 30 for a given lead of thread 68 of an article 67 to be tested is as follows: Supposing that the table 17 moves longitudinally a distance equal to the distance "B" between the pins 29 and 22. The carriage 72 with the pointer 94 should move transversely, and at right angles to the path of movement of the table 17, a distance equal to the lead of the thread 68 multiplied by the number of times which the gear 55 will be caused to turn by the rack 20 when the rack 20 moves the distance "B", multiplied by the ratio of the gear 56 to the gear 57. The number of times which the gear 55 will move in this distance is a fixed value, and the ratio between the gears 56 and 57 is also a fixed value, so that the transverse movement of the carriage 72 which in Fig. 8 is indicated by the distance "D" is readily determined. A right-angled triangle is thus formed having a base equal to B and a height equal to D with an angle A between the hypothenuse and the base which is readily determinable with these known dimensions. The distance D however does not correspond to the distance between the axis of the pins 29 and 30 inasmuch as the pin 30 is on the circumference of the circle which passes through the pin 29 and whose center is at the pin 22, thus making it necessary to find the length of a chord of such circle passing through the pins 29 and 30. Knowing that the radial line drawn through the center of the chord of such circle and which is indicated by the distance C is perpendicular to the chord, it is possible by a simple trigonometrical calculation to determine the length of half the chord from which the length of the chord is readily determined. After this distance C is determined, and allowing for the diameters of the pins 29 and 30, these pins may be accurately located by micrometers or other accurate measuring instruments to set the pin 30 with respect to the pin 29 that the required angle A exists between the axis of the sine bar 25 and the path of movement of the table 17, thus insuring the exact transverse movement of the carriage 72 and pointer bar 94 in accordance with the theoretical lead of the thread 68.

Although the accompanying drawings illustrate a preferred embodiment of the present invention, it will be apparent that the actual construction of the same may be subject to various modifications, and formal changes may be made in the specific embodiment of the invention described without departing from the spirit or substance of the broad invention, the scope of which is commensurate with the appended claims.

What I claim is:

1. A lead testing machine having means for rotatably supporting a piece of work having a helical surface whose lead is to be tested, a carriage, means for producing relative longitudinal movement between said work and carriage in proportion to the rotation of the work, an arm pivoted on said carriage, said arm being positioned so that one of its ends will contact the helical surface of said work while it rotates, and a measuring means on said carriage acting to measure very slight movements of said arm relative to said carriage whereby inaccuracies in the helical surface of said work may be readily measured.

2. A lead testing machine having means for rotatably supporting a piece of work having a helical surface whose lead is to be measured, a carriage, means for causing relative longitudinal movement between said work and carriage in proportion to the rotation of the work, an arm pivoted on said carriage having one of its ends positioned to contact the helical surface of said work while it is rotated, the distance between the pivot of said arm and said helical surface being much smaller than the distance between said pivot and the outer end of said arm, and micrometer measuring means on said carriage operated by the outer end of said arm in its movement in either direction for measuring slight movements of said arm relative to said carriage whereby inaccuracies in said helical surface may be readily measured.

3. A lead testing machine having means for rotatably supporting a piece of work having a helical surface whose lead is to be measured, a carriage, means for causing relative longitudinal movement between said work and carriage as the work rotates, a table pivoted on said carriage to swing about a vertical axis, an arm pivoted on said table to swing about an axis parallel to the axis about which said table swings, means for adjusting said table about its axis to bring one end of said arm into contact with the helical surface to be measured, and a measuring means carried by said table and cooperating with the outer end of said arm to measure slight movements of the arm relative to said table whereby inaccuracies in the helical surface may be readily measured.

4. A lead testing machine having means for rotatably supporting a piece of work having a helical surface whose lead is to be measured, a carriage, means for causing relative longitudinal movement between said work and carriage as the work rotates, a support on said carriage adjustable to and from said work, a table pivoted on said support to swing about a vertical axis, a pointer arm pivotally mounted on said table to swing about a vertical axis, means for adjusting said table to move one end of said arm into contact with the helical surface to be measured, and micrometer indicating means on said table cooperating with the outer end of said arm for indicating movements of said arm relative to said table while the work is being rotated whereby inaccuracies in the helical surface may be readily measured.

5. A lead testing machine having means for rotatably supporting a piece of work having a helical surface whose lead is to be measured, a carriage, means for causing relative longitudinal movement between said work and carriage while said work is being rotated, a support on said carriage movable to and from said work, a table pivoted on said support to swing about a vertical axis, a pointer arm pivoted on said table, one end of said arm being at a short distance from said pivot and being positioned to contact the helical surface to be measured, and the other end of said arm being at a much greater distance from said pivot, means for adjusting said table to position the short end of the arm in contact with the helical surface to be measured, and a micrometer measuring means on each side of the longer end of said arm, each of said measuring means having a portion contacting said arm to measure slight movements of the arm relative to the table to plainly indicate minute movements of the arm relative to said table in either direction.

6. A lead testing machine having means for rotatably supporting a piece of work having a helical surface whose lead is to be measured, a carriage, an arm pivoted on said carriage, one end of said arm being positioned to contact the helical surface of the work, micrometer measuring means on said carriage cooperating with the other end of said arm to measure slight movements thereof in either direction, a second carriage movable at right angles to the axis about which the work rotates, means for moving said second carriage, means for rotating said work holding means in proportion to the movements of said second carriage, an adjustable, angularly-positioned sine bar on said second carriage, and connections operated by said sine bar for causing relative longitudinal movement between said work and said first carriage while said work is rotating.

7. A lead testing machine having means for rotatably supporting a piece of work having a helical surface whose lead is to be tested, a carriage, an arm pivoted on said carriage, one end of said arm being positioned to contact the helical surface of the work, micrometer measuring means on said carriage cooperating with the other end of said arm to measure slight movements thereof in either direction, a second carriage movable at right angles to the axis about which the work rotates, means for moving said second carriage, connections between said second carriage and said work supporting means acting to rotate said work supporting means when said second carriage is moved, an adjustable, angularly-positioned sine bar on said second carriage, and connections between said sine bar and said second carriage causing said first carriage to move longitudinally relative to said work when said work rotates.

8. A lead testing machine having a spindle for rotatably supporting a piece of work having a helical surface whose lead is to be tested, a carriage, an arm pivoted on said carriage, one end of said arm being positioned to contact the helical surface of the work, micrometer measuring means on said carriage cooperating with the other end of said arm to measure slight movements thereof in either direction, a second carriage movable at right angles to the axis about which said work rotates, means for moving said carriage, a rack on said second carriage geared to said work spindle to drive it, an adjustable, angularly-positioned sine bar on said second carriage, and connections operated by said sine bar for causing relative longitudinal travel between said first carriage and said work when said work is rotated by said second carriage.

9. A hob testing machine comprising means for rotatably supporting a hob having a series of helically arranged teeth whose lead is to be measured, a carriage for supporting an indicator, means causing relative longitudinal movement between said hob supporting means and said carriage in timed relation to the rotation of said hob supporting means, an arm pivotally supported on said carriage, said arm being positioned so that one of its ends will contact the surfaces of the hob teeth while the hob rotates, and an indicator on said carriage operable by said arm to indicate very slight movements of said arm relative to its supporting carriage whereby inaccuracies in the lead of the hob will be plainly indicated.

JOSEPH C. DRADER.